(12) United States Patent
Ejima

(10) Patent No.: US 8,086,202 B2
(45) Date of Patent: Dec. 27, 2011

(54) METHOD FOR REMOVING THE COUPLING AND CORRELATION OF ANTENNAS, AND WIRELESS DEVICE HAVING THE FUNCTION OF REMOVING THE COUPLING AND CORRELATION OF ANTENNAS

(75) Inventor: Naoki Ejima, Osaka (JP)

(73) Assignee: Panasonic Corporation, Osaka (JP)

( * ) Notice: Subject to any disclaimer, the term of this patent is extended or adjusted under 35 U.S.C. 154(b) by 269 days.

(21) Appl. No.: 12/602,282

(22) PCT Filed: Apr. 8, 2009

(86) PCT No.: PCT/JP2009/001629
§ 371 (c)(1),
(2), (4) Date: Nov. 30, 2009

(87) PCT Pub. No.: WO2009/128221
PCT Pub. Date: Oct. 22, 2009

(65) Prior Publication Data
US 2010/0190461 A1     Jul. 29, 2010

(30) Foreign Application Priority Data

Apr. 16, 2008   (JP) .................... 2008-106499

(51) Int. Cl.
*H04B 1/06*         (2006.01)
*H04K 3/00*         (2006.01)
(52) U.S. Cl. .................... 455/276.1; 455/139
(58) Field of Classification Search ............ 455/132, 455/137–139, 272–273, 276.1, 278.1; 375/347
See application file for complete search history.

(56) References Cited

U.S. PATENT DOCUMENTS

| | | | |
|---|---|---|---|
| 4,373,210 A * | 2/1983 | Karabinis et al. | ............. 455/273 |
| 4,384,366 A * | 5/1983 | Kaitsuka | .................... 455/278.1 |
| 5,349,609 A | 9/1994 | Tsujimoto | |
| 6,469,680 B1 | 10/2002 | Kelliher | |
| 6,704,557 B1 * | 3/2004 | Krishnamurthy et al. | . 455/278.1 |
| 2004/0185815 A1 | 9/2004 | Fukuda et al. | |
| 2005/0181755 A1 | 8/2005 | Hoshino et al. | |
| 2006/0291598 A1 | 12/2006 | Gebara et al. | |

FOREIGN PATENT DOCUMENTS

| | | |
|---|---|---|
| JP | 06-061893 A | 3/1994 |
| JP | 09-312511 A | 12/1997 |
| JP | 2000-504189 A | 4/2000 |
| JP | 2004-236171 A | 8/2004 |

OTHER PUBLICATIONS

International Search Report for PCT/JP2009/001629.

* cited by examiner

*Primary Examiner* — Lee Nguyen
(74) *Attorney, Agent, or Firm* — Pearne & Gordon LLP

(57) ABSTRACT

A wireless device, which employs the method and function of removing the coupling and correlation of antennas, picks up the noise components released from inside the device together with the current induced to a second antenna. The wireless device then controls the amplitude and phase of the pickup signal so as to optimize the reception quality signal for received signal, and additively combines it with the signal received from the first antenna. The coupled component, which is induced from the first antenna to the second antenna, is cancelled together with the noise component, thus mainly cancelling the largest cause of desensitization. This results in the maximization of the receiving sensitivity.

16 Claims, 12 Drawing Sheets

METHOD FOR REMOVING THE COUPLING AND CORRELATION OF ANTENNAS, AND WIRELESS DEVICE HAVING THE FUNCTION OF REMOVING THE COUPLING AND CORRELATION OF ANTENNAS

TECHNICAL FIELD

The present invention relates to a broadcast receiving device, and more particularly, to a receiving device small enough to be portable. The present invention further more particularly relates to a method for removing the coupling and correlation of antennas so as to receive broadcast waves with high sensitivity and stability using the diversity function, and also to a wireless device having the function of removing the coupling and correlation of antennas.

BACKGROUND ART

Conventionally, diversity receiving devices are available to receive broadcast waves stably when broadcast receiving devices are on the move. As a method for reducing desensitization due to self noise in a receiver, a noise cancelling technique is disclosed in Patent Literature 1. According to this technique, the noise is first processed to have an opposite phase and an appropriate amplitude, and then injected into the reception circuit so as to cancel the noise.

FIGS. 10 to 12 show a wireless transceiver disclosed in Patent Literature 1. FIG. 10 shows wireless communication terminal 700 having two antennas as an example of the wireless transceiver. In wireless communication terminal 700, signals are received by receiving antennas 601 and 602, demodulated by receivers 701 and 702, respectively, and then transmitted to interference canceller 703. Interference canceller 703 removes radiation noise components from the signals, and outputs signals containing no radiation noise to information processing system 704.

FIG. 11 shows a first example of interference canceller 703 of FIG. 10. This example is effective when the interference signals received by receiving antennas 601 and 602 are highly correlated with each other. Receiver 701 demodulates a signal received by receiving antenna 60 1 and outputs signal 705, which is the sum of a desired signal and an interference signal. Receiver 702, on the other hand, demodulates a signal received by receiving antenna 602 and outputs signal 706, which is the sum of a desired signal and an interference signal. Signal 706 is outputted to amplitude-phase regulating unit 802, which controls the interference signal contained in signal 706 to be equal in amplitude and phase to the interference signal contained in signal 705. Amplitude-phase regulating unit 802 then outputs regulated signal 708 to addition unit 803, which adds signal 708 with signal 704, and then outputs signal 710.

In the default setting, the interference signal contained in signal 710 outputted from addition unit 803 is monitored without transmitting data. Since signal 710 does not contain data in this condition, amplitude-phase regulating unit 802 sets the electric power of the interference signal obtained by adding signals 705 and 708 to be substantially zero. This default setting allows interference canceller 703 to operate stably and hence to attenuate radiation noise with increasing correlation between the interference signals received by receiving antennas 601 and 602.

FIG. 12 shows another example of interference canceller 703 of FIG. 10. In this example, interference canceller 703 receives radiation noise directly from an electronic device, a PC 914 (Personal Computer) via cable 912. Interference canceller 703 then inputs the radiation noise information to amplitude-phase regulating units 904 and 905 to generate pseudo-interference signals 728 and 730 of the receiving systems. The outputs of amplitude-phase regulating units 904 and 905 are respectively inputted to second and first addition units 902 and 901 as pseudo-interference signals 728 and 730, which become the output signals of radiation noise predictor 903. First and second addition units 901 and 902 subtract pseudo-interference signals 730 and 728, respectively, from the received signals. As a result, first and second addition units 901 and 902 output data 732 and 734, respectively, from which the radiation noise has been removed. Data 732 and 734 are then received by diversity reception device 910.

These conventional devices using noise-cancelling and diversity techniques, however, are large in size and usually mounted on vehicles such as cars, thus being not suitable to be reduced to a portable size. When reduced to a portable size, these devices cause a decrease in the receiving sensitivity due to the coupling between diversity antennas and also cause gain degradation due to the diversity correlation. This makes it impossible for these devices to provide desired high-sensitivity reception.

When a device includes a plurality of noise sources, such as a signal processing circuit, a clock part, a liquid crystal display driving part, bus lines in various types of memories, and a DC-DC converter, it is difficult to identify the noise component causing the gain degradation in each channel. Therefore, cancelling the noise component causing the gain degradation requires picking up all the related noise components.

As described above, in the technique disclosed in Patent Literature 1, the radiation noise is directly received from the electronic device, the PC 914 as a noise source via cable 912. Then, amplitude-phase regulating units 904 and 905 generate pseudo-interference signals of the receiving systems, using the received radiation noise information. The outputs of amplitude-phase regulating units 904 and 905 are inputted to second and first addition units 902 and 901 as pseudo-interference signals 728 and 730, which become the output signals of radiation noise predictor 903. Thus, first and second addition units 901 and 902 subtract pseudo-interference signals 730 and 728, respectively, from the received signals.

Therefore, the technique disclosed in Patent Literature 1 is effective to the noise component of the electronic device, the PC 914, but does not act on the other noise sources inside. Thus, this technique does not reduce desensitization caused by their noises.

When the technique is applied to a small-sized device, the device causes a decrease in the receiving sensitivity due to the coupling between diversity antennas and also causes gain degradation due to the diversity correlation. Thus, the problem of not having the ability to provide high-sensitivity reception remains unsolved.

Patent Literature 1: Japanese Patent Unexamined Publication No. 2004-236171

SUMMARY OF THE INVENTION

The present invention is directed to provide a method for removing the coupling and correlation of antennas for diversity reception in which a first antenna and a second antenna are placed so that the distance between a part or a feeding point of the first antenna and a part or a feeding point of the second antenna is within ½ of the wavelength of a received radio wave.

A first placement step places a first sensor in the vicinity of the ground plane of the feeding point of the second antenna; a first amplitude-phase regulator controlling the amplitude and phase of a first pickup signal outputted from the first sensor; a first adder receiving and adding the output signal of the first antenna and the output signal of the first amplitude-phase regulator and outputting the addition result as an output signal; a first tuner receiving the output signal of the first antenna via the first adder; and a second tuner receiving the output signal of the second antenna.

A second placement step places a diversity receiver receiving the output signals of the first and second tuners; and a controller receiving a reception quality signal from the diversity receiver.

An amplitude-phase regulation step allows the first amplitude-phase regulator to control the amplitude and phase of the pickup signal outputted from the first sensor.

A first input step allows the first adder to receive and add the output signal of the first antenna and the output signal of the first amplitude-phase regulator as the two output signals and then to output the addition result as an output signal, and also allows the first tuner to receive the output signal of the first antenna via the first adder.

A second input step allows the second tuner to receive the output signal of the second antenna.

A third input step allows the diversity receiver to receive the output signals of the first and second tuners.

A combination step allows the diversity receiver to combine the output signals of the first and second tuners.

A demodulation step allows the diversity receiver to perform diversity demodulation using the output signals of the first and second antennas.

A control step allows the controller to control the amplitude and phase of the first pickup signal according to the reception quality signal outputted from the diversity receiver so as to control the first amplitude-phase regulator for optimizing the reception quality signal.

The present invention is directed to also provide a wireless device having the function of removing the coupling and correlation of antennas so as to perform diversity reception in which first and second antennas are placed so that the distance between a part or the feeding point of the first antenna and a part or the feeding point of the second antenna is within ½ of the wavelength of a received radio wave. The wireless device includes a first sensor, a first amplitude-phase regulator, a first adder, a first tuner, a second tuner, a diversity receiver, and a controller.

The first sensor is placed in the vicinity of the ground plane of the feeding point of the second antenna. The first amplitude-phase regulator controls the amplitude and phase of a first pickup signal outputted from the first sensor. The first adder receives and adds the output signal of the first antenna and the output signal of the first amplitude-phase regulator as the two output signals and outputs the addition result as an output signal. The first tuner receives the output signal of the first antenna via the first adder. The second tuner receives the output signal of the second antenna. The diversity receiver receives the output signals of the first tuner and the second tuner. The controller receives the reception quality signal from the diversity receiver.

The diversity receiver combines the output signals of the first and second tuners, and performs diversity demodulation using the output signals of the first and second antennas. The controller controls the amplitude and phase of the first pickup signal according to the reception quality signal outputted from the diversity receiver so as to control the first amplitude-phase regulator for optimizing the reception quality signal.

With this structure, the coupled component, which is induced from the first antenna to the second antenna, is cancelled together with the noise component, thus mainly cancelling the largest cause of desensitization. This results in the maximization of the receiving sensitivity.

Figure 1:
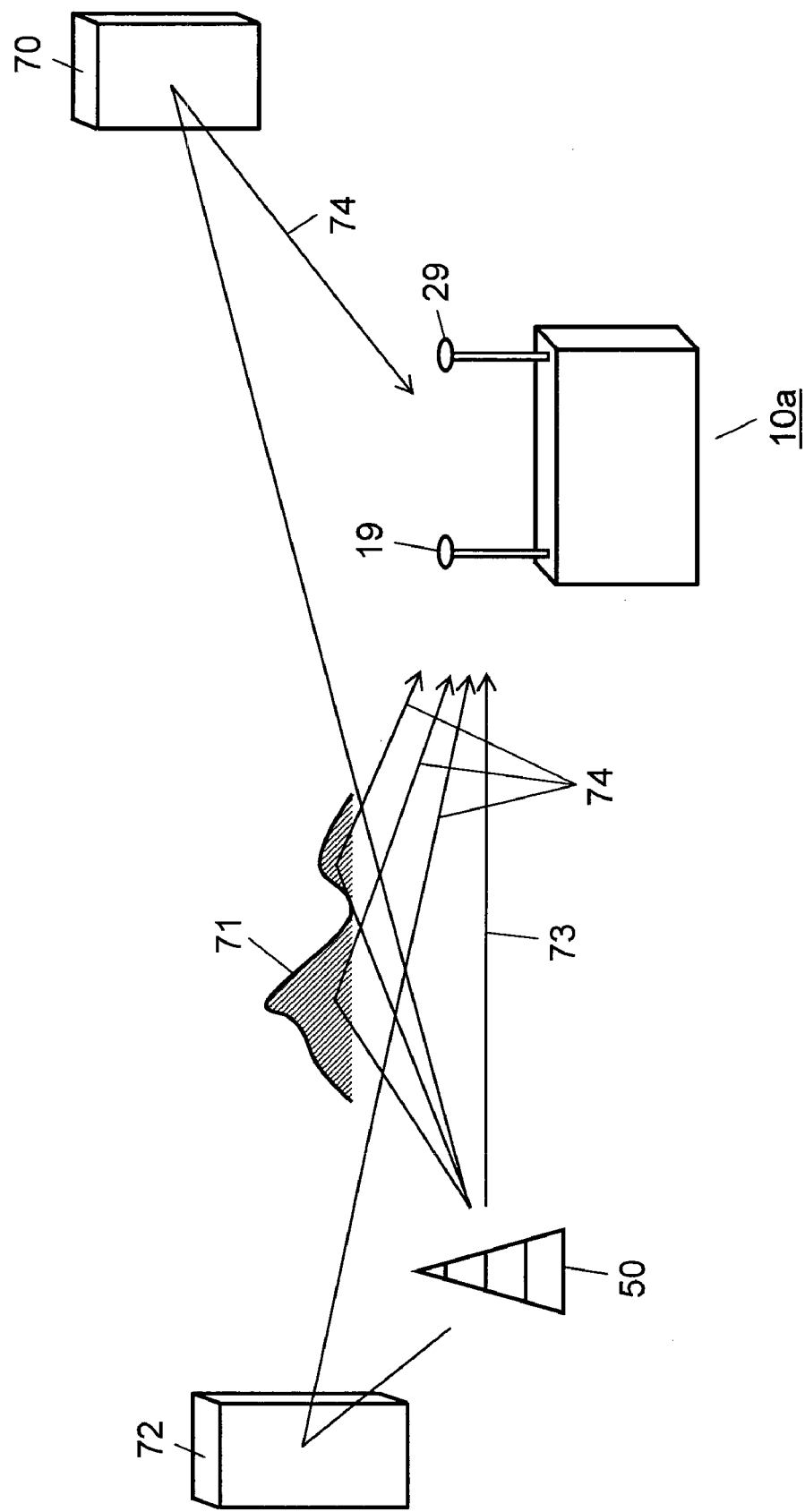
FIG. 1 is a schematic diagram showing how radio waves reach a wireless device having the function of removing the coupling and correlation of antennas according to a first exemplary embodiment of the present invention.

REFERENCE MARKS IN THE DRAWINGS 10a, 10b, 10c, 10d, 10e wireless device
11, 21 matching circuit
12 first amplitude-phase regulator
13 first adder
14 first tuner
17, 27 arrow
18 second sensor
19, 19b first antenna
22 second amplitude-phase regulator
23 second adder
28 first sensor
29, 29b second antenna
34 second tuner
30 diversity receiver
31 reception quality signal
40 controller 42, 42a, 42b, 42d, 44, 44a arrow
50 broadcasting station
60, 62, 64, 66, 68 vector representation
70, 72 building
71 mountains
73 direct wave
74 indirect wave
d distance
λ radio wavelength

DETAILED DESCRIPTION OF PREFERRED EMBODIMENTS

Exemplary embodiments of the present invention will be described as follows with reference to drawings.

First Exemplary Embodiment

FIG. 1 is a schematic diagram showing how radio waves reach wireless device 10a having the function of removing the coupling and correlation of antennas according to the present exemplary embodiment in a general environment. Wireless device 10a of the present exemplary embodiment includes first antenna 19 and second antenna 29 having the same plane of polarization.

In the case of a fixed wireless device, a signal is brought into a house or other indoor places from a strong directional antenna, which is generally mounted on a roof. In the case of a portable device such as wireless device 10a of the present exemplary embodiment, on the other hand, the antenna is omnidirectional and its polarized direction is not uniquely specified because the location and direction of the device keep changing during travel. The reason for using such an antenna is that the plane of polarization changes diversely in order to effectively receive not only direct wave 73 but also indirect wave 74, which reaches wireless device 10a after being reflected by buildings 70 and 72 or mountains 71. Therefore, portable wireless devices employing diversity reception generally combine space diversity for achieving spatial split effect and polarization diversity based on the difference in the plane of polarization.

Figure 2:
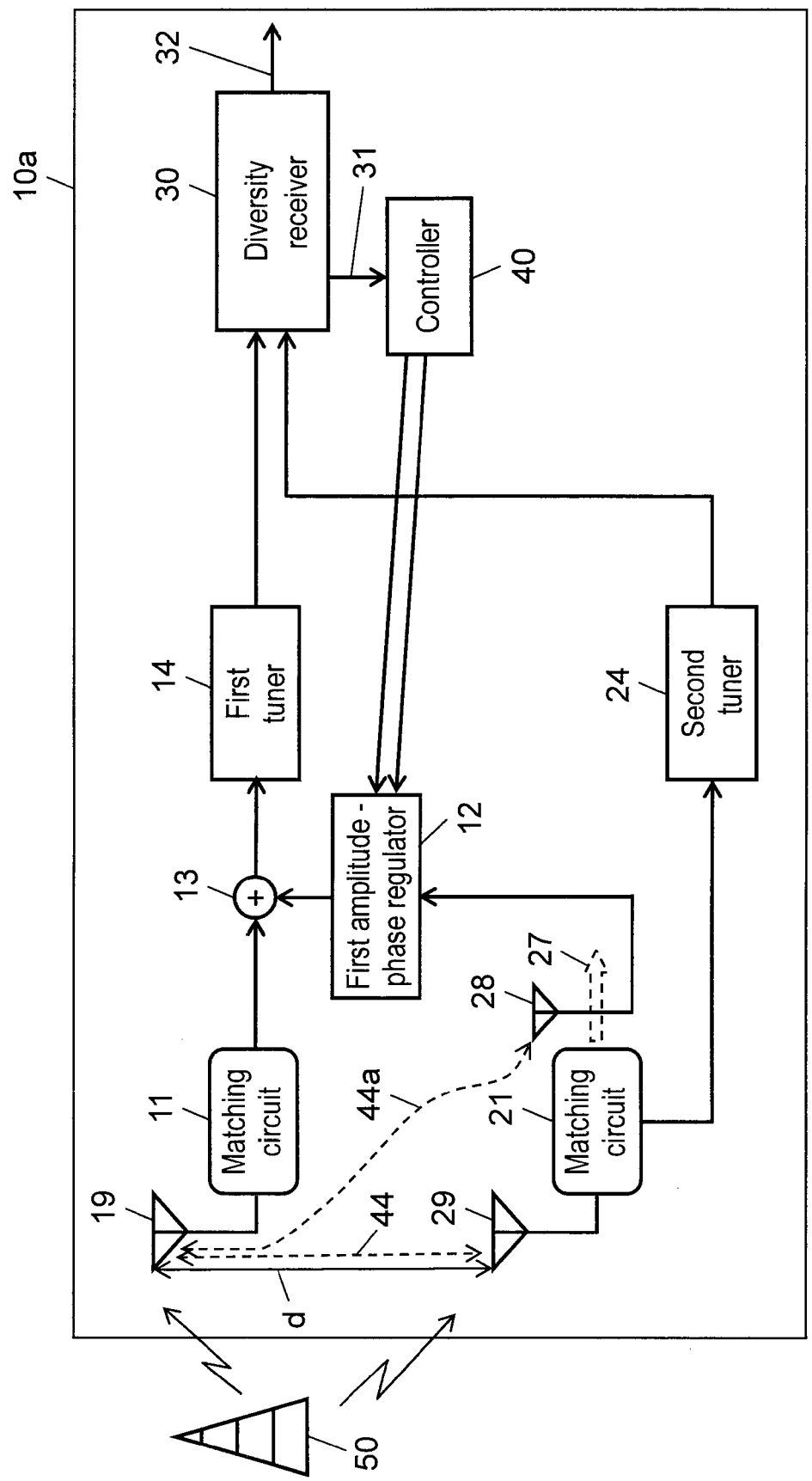
FIG. 2 is a block diagram of the wireless device having the function of removing the coupling and correlation of antennas according to the first exemplary embodiment of the present invention.

FIG. 2 is a block diagram of wireless device 10a having the function of removing the coupling and correlation of antennas according to the first exemplary embodiment. Wireless device 10a having the function of removing the coupling and correlation of antennas includes first antenna 19, second antenna 29, first sensor 28, first amplitude-phase regulator 12, first adder 13, first tuner 14, second tuner 24, diversity receiver 30, and controller 40.

Wireless device 10a, having the function of removing the coupling and correlation of antennas according to the present exemplary embodiment, is suitable for a system which receives terrestrial digital broadcasting using a UHF band with a frequency range of 470 to 770 MHz. The radio wave of the terrestrial digital broadcasting has a wavelength λ of about 0.64 m when the frequency is 470 MHz, and of about 0.39 m when the frequency is 770 MHz. A portable device such as wireless device 10a having the function of removing the coupling and correlation of antennas according to the present exemplary embodiment, however, has size limitations to maintain its portability. Therefore, the distance "d" between first and second antennas 19 and 29 is limited to at most 0.3 m, which is less than ½ wavelength depending on the frequency of the radio wave. When the spatial distance between first and second antennas 19 and 29 is small, these antennas are coupled to cause mutual interference, thereby tending to reduce receiving sensitivity.

Wireless device 10a having the function of removing the coupling and correlation of antennas according to the present exemplary embodiment performs diversity reception in which first and second antennas 19 and 29 are placed so that the distance "d" between a part or the feeding point of first antenna 19 and a part or the feeding point of second antenna 29 is within ½ of the wavelength of a received radio wave.

Wireless device 10a further includes matching circuit 11, which performs impedance matching between first antenna 19 and first adder 13 at a later stage so as to maximize the signal receiving sensitivity of first antenna 19. First adder 13 includes first and second input terminals. The first input terminal receives the output signal of first antenna 19 via matching circuit 11. The second input terminal receives the output signal of first amplitude-phase regulator 12. First adder 13 then adds the signals inputted to the first and second input terminals and outputs the addition result. Thus, first adder 13 receives and adds the output signal of first antenna 19 and the output signal of first amplitude-phase regulator 12 as the two output signals and outputs the addition result as an output signal.

First tuner 14 receives the output signal of first adder 13. Thus, first tuner 14 receives the output signal of first antenna 19 via matching circuit 11 and first adder 13. First tuner 14 performs RF amplification, frequency conversion, and the like.

Wireless device 10a further includes matching circuit 21, which performs impedance matching between second antenna 29 and second tuner 24 at a later stage in the same manner as first tuner 14 so as to maximize the signal receiving sensitivity of second antenna 29. Thus, second tuner 24 receives the output signal of second antenna 29 via matching circuit 21. Second tuner 24 performs RF amplification, frequency conversion, and the like. In the present exemplary embodiment, first and second antennas 19 and 29 are oriented substantially in the same direction as shown by arrow 44 in FIG. 2.

Diversity receiver 30 includes first and second input terminals. The first input terminal receives the output signal of first tuner 14, and the second input terminal receives the output signal of second tuner 24. Thus, diversity receiver 30 receives and combines the output signals of first and second tuners 14 and 24. Diversity receiver 30 outputs combined signal 32. This combination can be, for example, carrier maximum ratio combining so as to perform diversity demodulation.

Controller 40 receives reception quality signal 31 from diversity receiver 30 so as to control first amplitude-phase regulator 12 according to reception quality signal 31.

First sensor 28 and first antenna 19 are oriented substantially in the same direction as shown by arrow 44a in FIG. 2. First sensor 28 is placed in the vicinity of the ground plane of the feeding point of second antenna 29 so as to pick up a current component due to electromagnetic coupling (shown by arrow 27 in FIG. 2) of second antenna 29 flowing to the ground plane of matching circuit 21 of second antenna 29. More specifically, first sensor 28 is placed within the area of ¼ λ including the current component due to electromagnetic coupling and within 0.15 m from the feeding point of second antenna 29, that is, from the ground part of matching circuit 21. Thus, the feeding point of second antenna 29 and the center of first sensor 28 are away from each other by a distance within ¼ of the wavelength of a received radio wave.

The signal component received by second antenna 29 is induced to first sensor 28, which is thus placed close to second antenna 29. First sensor 28 also picks up the noise components released from the various noise sources in the device together with the signal component received by second antenna 29. First amplitude-phase regulator 12 controls the amplitude and phase of a first pickup signal outputted from first sensor 28.

Controller 40 controls the amplitude and phase of the first pickup signal outputted from first sensor 28 according to reception quality signal 31 outputted from diversity receiver 30 so as to control first amplitude-phase regulator 12, thereby optimizing reception quality signal 31. This control allows wireless device 10a according to the present exemplary embodiment to have the function of removing the coupling and correlation of antennas. The operation to cancel the coupled component of the two antennas will be detailed later.

Reception quality signal 31 can be at least one of a received signal strength indication parameter (RSSI), a bit error ratio (BER), and a C/N ratio (Carrier to Noise Ratio), which indicate final reception quality. Diversity receiver 30 outputs reception quality signal 31 to controller 40. Controller 40 feeds back the control parameters to first amplitude-phase regulator 12 based on reception quality signal 31.

Reception quality signal 31 becomes an optimum value when the received signal strength parameter indicates that the signals received by first and second antennas 19 and 29 have the maximum electric field strength, when the bit error ratio is minimum, or when the C/N ratio is maximum. Thus, diversity receiver 30 has a function of detecting the received signal strength parameter, the bit error ratio, and the C/N ratio which are described above.

Figure 3:
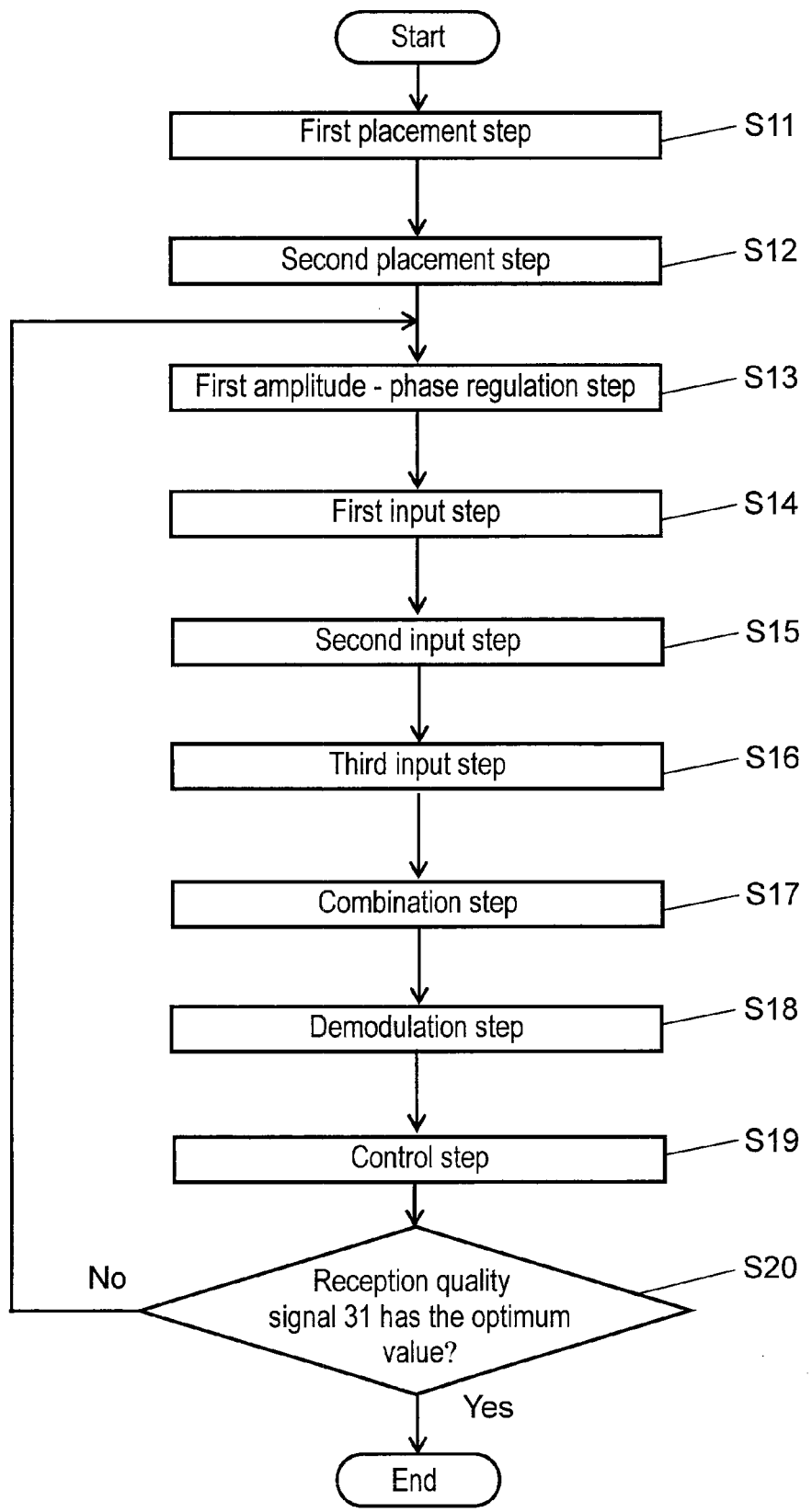
FIG. 3 is a flowchart showing a method for removing the coupling and correlation of antennas according to the first exemplary embodiment of the present invention.

A specific procedure of the method for removing the coupling and correlation of antennas according to the present exemplary embodiment will be described as follows. FIG. 3 is a flowchart showing the method according to the present exemplary embodiment. The method for removing the coupling and correlation of antennas according to the present exemplary embodiment involves diversity reception in which first and second antennas 19 and 29 are placed so that the distance "d" between a part or the feeding point of first antenna 19 and a part or the feeding point of second antenna 29 is within ½ of the wavelength of a received radio wave.

A first placement step places first sensor 28 in the vicinity of the ground plane of the feeding point of second antenna 29. First, the reception frequency is set to a channel having a low level of first pickup signal outputted from first sensor 28, which is a combined noise source used for removing the coupling and correlation of antennas. This channel can be preset based on clock frequencies of the units used in the system.

The first placement step also places first amplitude-phase regulator 12, which receives the first pickup signal from first sensor 28. The signal component received by second antenna 29 is induced to first sensor 28. First sensor 28 also picks up the noise component released from the various noise sources in the device together with the signal component received by second antenna 29. The first placement step then places first adder 13, which receives and adds the output signal of first antenna 19 and the output signal of first amplitude-phase regulator 12 and outputs the addition result as an output signal.

The first placement step then places first and second tuners 14 and 24, which receive the output signal of first antenna 19 via first adder 13, and the output signal of second antenna 29, respectively (Step S11).

A second placement step places diversity receiver 30, which receives the output signals of first and second tuners 14 and 24, and controller 40, which receives reception quality signal 31 from diversity receiver 30 (Step S12). Controller 40 first supplies first amplitude-phase regulator 12 with control parameters as a default value, and then controls the amplitude and phase of the signal of first sensor 28 by the control parameters.

Thus, a first amplitude-phase regulation step allows first amplitude-phase regulator 12 to control the amplitude and phase of a pickup signal outputted from first sensor 28 (Step S13).

Then, the output signal of first amplitude-phase regulator 12 is applied to the second input terminal of first adder 13. The signal received from first antenna 19 via matching circuit 11, on the other hand, is applied to the first input terminal of first adder 13. Thus, the first input step allows first adder 13 to receive and add the output signal of first antenna 19 and the output signal of first amplitude-phase regulator 12 as the two output signals and then to output the addition result as an output signal. The first input step also allows first tuner 14 to receive the output signal of first antenna 19 via first adder 13 (Step S14).

A second input step allows second tuner 24 to receive the output signal from second antenna 29 (Step S15).

A third input step allows diversity receiver 30 to receive the output signals of first and second tuners 14 and 24 (Step S16).

A combination step allows diversity receiver 30 to combine the output signals of first and second tuners 14 and 24 (Step S17). Diversity receiver 30 then outputs reception quality signal 31. Controller 40 receives reception quality signal 31.

A demodulation step allows diversity receiver 30 to perform diversity demodulation using the output signals of first and second antennas 19 and 29 (Step S18).

A control step allows controller 40 to further control the amplitude and phase of the first pickup signal according to reception quality signal 31 outputted from diversity receiver 30 so as to optimize reception quality signal 31 (Step S19). Thus, controller 40 changes some of the control parameters with reference to the received signal strength indication parameter (RSSI), the bit error ratio (BER), and the C/N ratio (CN) indicating the reception quality at this time.

When the value of reception quality signal 31 increases or decreases as a result of changing the control parameters, controller 40 stores the optimum value in the memory, and then confirms whether or not reception quality signal 31 has the optimum value (Step S20). When it is optimum (Yes), the series of processes is completed; otherwise (No), the process goes back to Step S13 to repeat the series of processes. Controller 40 shifts the change of the control parameters from rough to detailed, thereby improving control precision. Thus, controller 40 controls first amplitude-phase regulator 12 so as to optimize reception quality signal 31.

Figure 4:
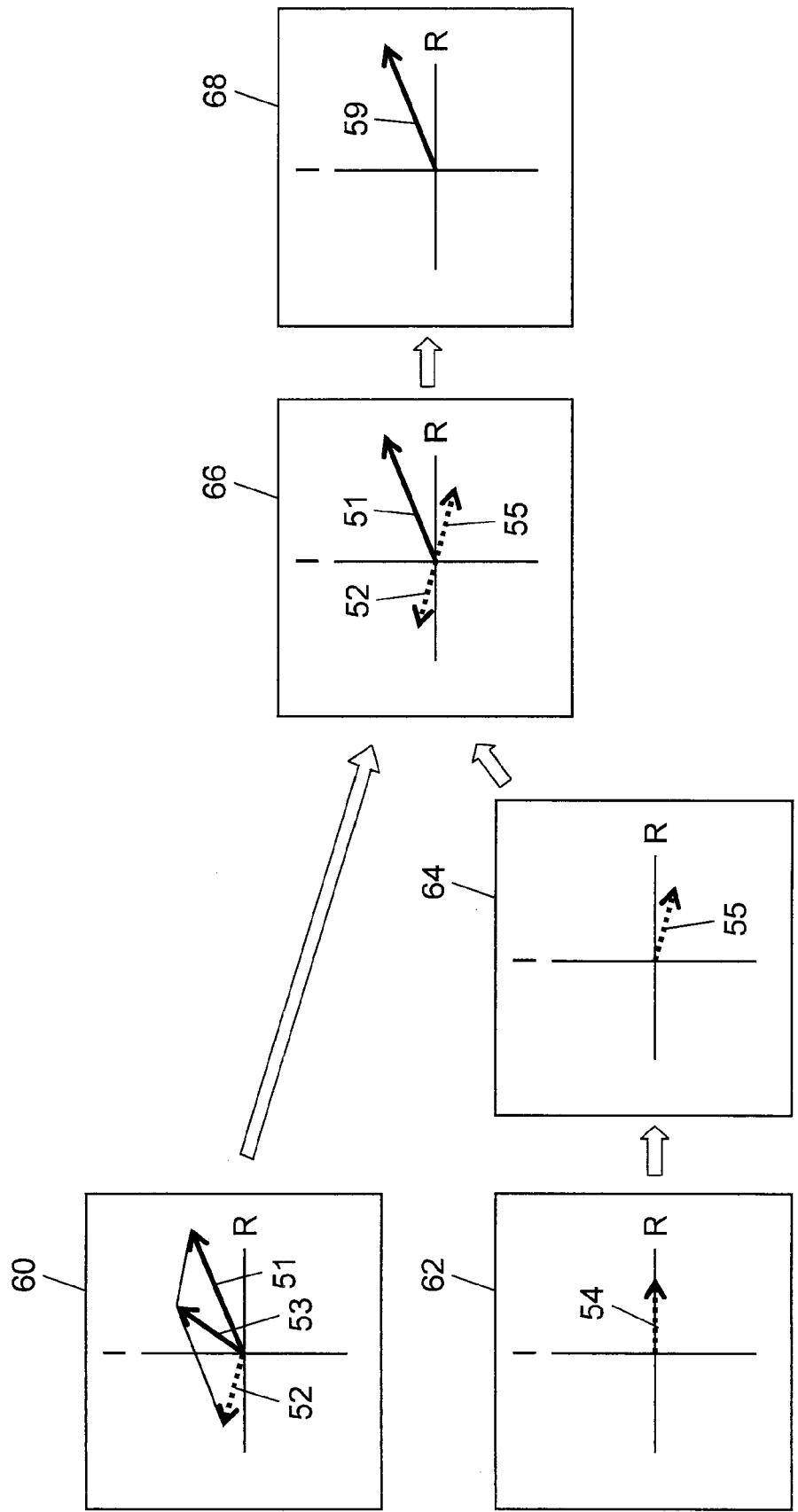
FIG. 4 shows the operation of the wireless device having the function of removing the coupling and correlation of antennas according to the first exemplary embodiment of the present invention to cancel a coupled component using vector synthesis.

FIG. 4 shows the operation of wireless device 10a having the function of removing the coupling and correlation of antennas according to the present exemplary embodiment to cancel a coupled component using vector synthesis. A coupled component is caused by the interaction of the two antennas, which are placed close to each other. In the present exemplary embodiment, the coupled component, which is induced from second antenna 29 to first antenna 19, is cancelled so as to prevent the coupled component from causing the desensitization of first antenna 19.

FIG. 4 shows five vector representations 60, 62, 64, 66, and 68. Vector representation 62 represents the signal component induced to first sensor 28 as vector 54. The signal component is induced to first sensor 28 mainly by the current component due to electromagnetic coupling, which move toward the ground plane of second antenna 29. Therefore, the signal component has the same phase as the signal component received by second antenna 29. The signal component carrier received by second antenna 29 is on the R axis as a reference to the display system of vector representation 62. The axis 90 degrees behind the R axis is shown as an I axis so as to form a vector display system. The other vector representations 60, 64, 66, and 68 are displayed in the same manner.

Vector representation 64 shows vector 55 representing the results of the amplitude and phase of a signal component, which is received and controlled by first amplitude-phase regulator 12 in order to be induced to first sensor 28.

Vector representation 60 shows two vectors 51 and 52 representing two signal components to be induced to first antenna 19, and also shows vector 53, which is a combination of vectors 51 and 52. Vector 51 is a signal received from broadcasting station 50. Vector 51 of the received signal is present with vector 52 of a coupled component, which is induced from second antenna 29 due to the antenna coupling. A combined signal of them becomes synthesized vector 53, and actually outputted from first antenna 19. Thus, vector 53 has a smaller amplitude than vector 51 of the received signal due to the coupled component, which is induced from second antenna 29 located near first antenna 19. The following is a description of a method for cancelling vector 52, which is the coupled component.

Vector representation 66 shows the input signals of first adder 13 as vectors 51, 52, and 55. More specifically, vector representation 66 shows vectors 51 and 52 of vector representation 60, vector 55 of vector representation 64, and vector 51 obtained by combining vectors 51, 52, and 55. Vector 52, which is the coupled component induced from second antenna 29 to first antenna 19, can be cancelled by vector 55, which is obtained under the control of first amplitude-phase regulator 12. As a result, the combined received signal indicated by vector 59 can be obtained as the output signal of first adder 13 as shown in vector representation 68. Vector 59 is identical to vector 51. This eliminates a decrease in the receiving sensitivity due to the close location of the two antennas, thereby maximizing the receiving sensitivity of first antenna 19.

As described above, in wireless device 10a having the function of removing the coupling and correlation of antennas according to the present exemplary embodiment, first and second sensors 28 and 19 are oriented substantially in the same direction. In other words, first sensor 28 is oriented so that the first pickup signal outputted therefrom can contain as many signals in the plane of polarization of first antenna 19 as possible. This increases the effect of cancelling the component which degrades the receiving sensitivity due to the antenna coupling in the present exemplary embodiment.

Thus, the wireless device having the function of removing the coupling and correlation of antennas according to the present exemplary embodiment can be a small-sized inexpensive portable receiver providing high sensitivity and stability using diversity and noise-cancelling techniques.

Second Exemplary Embodiment

Figure 5:
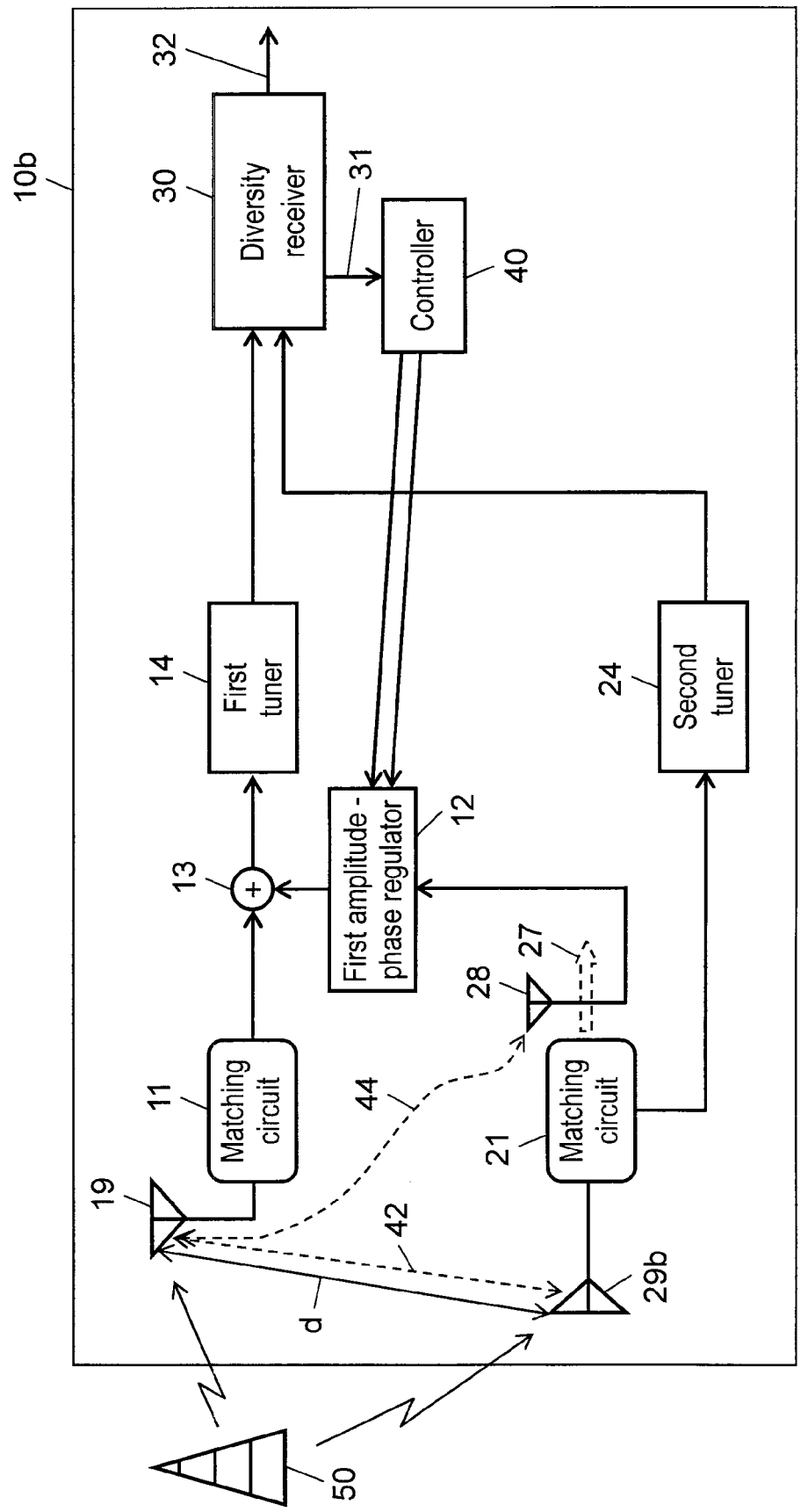
FIG. 5 is a block diagram of a wireless device having the function of removing the coupling and correlation of antennas according to a second exemplary embodiment of the present invention.

FIG. 5 is a block diagram of wireless device 10b having the function of removing the coupling and correlation of antennas according to a second exemplary embodiment of the present invention. In the first exemplary embodiment, first and second antennas 19 and 29 are oriented substantially in the same direction as shown in FIG. 2. In wireless device 10b according to the present second exemplary embodiment, on the other hand, first antenna 19 and second antenna 29b are oriented substantially orthogonal to each other as shown by arrow 42 of FIG. 5. More specifically, first antenna 19 receives signals mainly in the vertical plane of polarization, and second antenna 29b receives signals mainly in the horizontal plane of polarization. In the present exemplary embodiment, like components and functions are labeled with like reference numerals with respect to the first exemplary embodiment and hence the description thereof will be omitted.

Similar to the first exemplary embodiment, first sensor 28 receives signals mainly in the plane of polarization in the same direction as first antenna 19 as shown by arrow 44 of FIG. 5. First and second antennas 19 and 29b are apart from each other by distance "d"[m]. Thus, similar to wireless device 10a according to the first exemplary embodiment, in wireless device 10b according to the present exemplary embodiment, first and second antennas 19 and 29b are placed so that the distance "d" between a part or the feeding point of first antenna 19 and a part or the feeding point of second antenna 29b is within ½ of the wavelength of a received radio wave.

The other components are identical to those in the first exemplary embodiment. Therefore, in the present exemplary embodiment, too, the coupled component, which is induced from second antenna 29b to first antenna 19 due to the antenna coupling is cancelled to prevent the coupled component from causing the desensitization of first antenna 19. As a result, wireless device 10b having the function of removing the coupling and correlation of antennas according to the present exemplary embodiment also has the effect of removing the coupling and correlation of antennas.

As described above, in the present exemplary embodiment, first and second antennas 19 and 29b are oriented substantially orthogonal to each other as shown by arrow 42, and first sensor 28 and first antenna 19 are oriented substantially in the same direction as shown by arrow 44. These placements allow first and second antennas 19 and 29b to be much more loosely coupled than in the first exemplary embodiment in which first and second antennas 19 and 29 are oriented substantially in the same direction. Making first and second antennas 19 and 29b have different planes of polarization from each other in this manner can reduce the signal due to the electromagnetic coupling between first and second antennas 19 and 29b, which is the cause of desensitization. In addition, first sensor 28 is oriented so that the first pickup signal outputted therefrom can contain as many signals in the plane of polarization of first antenna 19 as possible. This increases the effect of cancelling the component which degrades the receiving sensitivity due to the antenna coupling in the present exemplary embodiment.

Third Exemplary Embodiment

Figure 6:
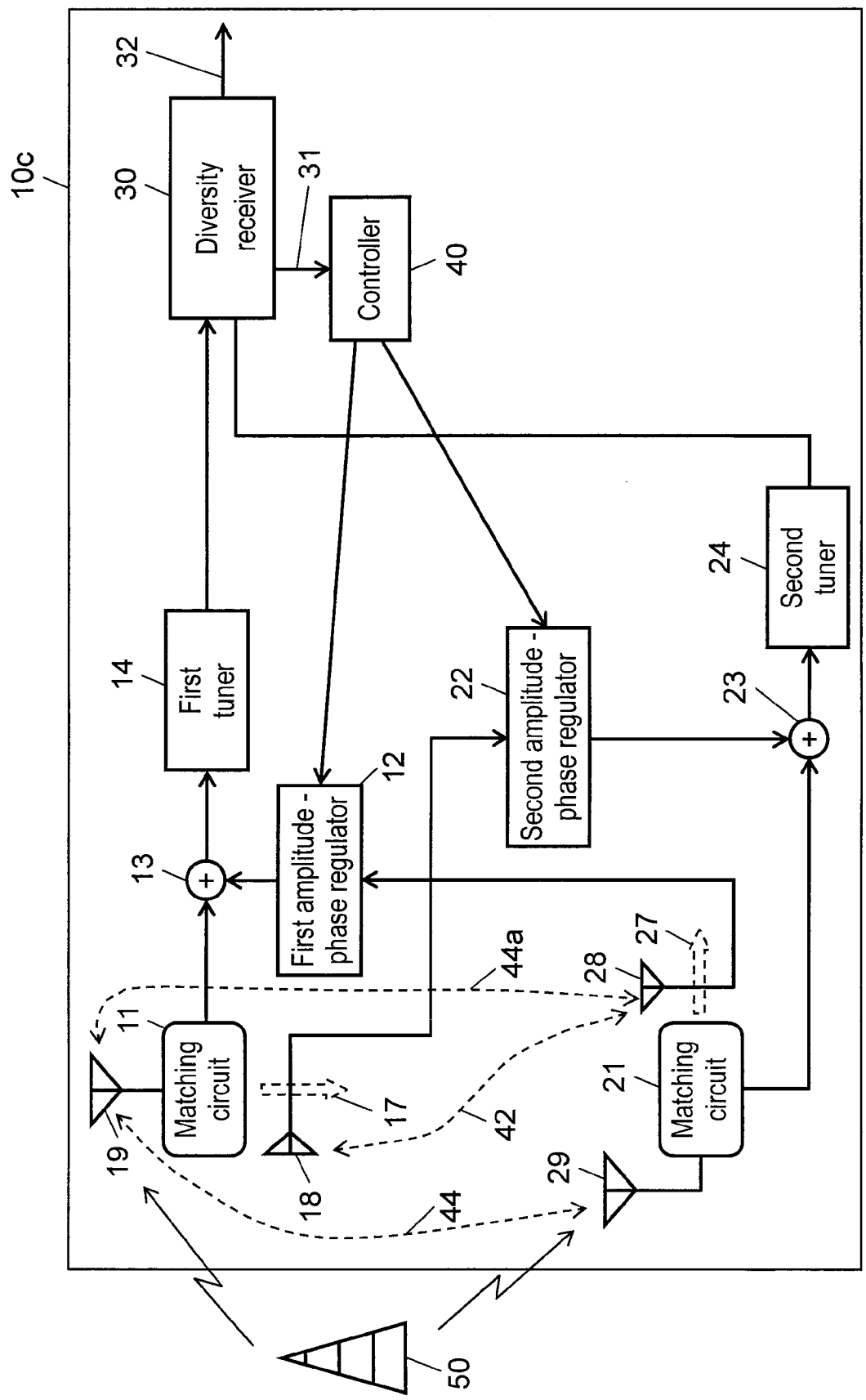
FIG. 6 is a block diagram of the wireless device having the function of removing the coupling and correlation of antennas according to a third exemplary embodiment of the present invention.

FIG. 6 is a block diagram of wireless device 10c having the function of removing the coupling and correlation of antennas according to a third exemplary embodiment of the present invention. In the first exemplary embodiment, diversity receiver 30 receives the output signal of second antenna 29 directly from matching circuit 21 via second tuner 24 so as to simplify the circuit configuration. In the third exemplary embodiment, on the other hand, as shown in FIG. 6, the system including second antenna 29 has the same structure as the system including first antenna 19 so as to cancel the antenna coupling independently of each other.

As shown in FIG. 6, wireless device 10c having the function of removing the coupling and correlation of antennas according to the present exemplary embodiment includes, in addition to the structure of the first exemplary embodiment shown in FIG. 2, second sensor 18, second amplitude-phase regulator 22, and second adder 23. The other components and functions are identical to those in the first exemplary embodiment, and hence the description thereof will be omitted.

Wireless device 10c further includes matching circuit 21, which performs impedance matching between first and second antennas 19 and 29 so as to maximize the signal receiving sensitivity of second antenna 29. Second adder 23 includes first and second input terminals. The first input terminal receives the output signal of second antenna 29 via matching circuit 21. The second input terminal receives the output of second amplitude-phase regulator 22. Second adder 23 then adds the signals inputted to the first and second input terminals and outputs the addition result. Thus, second adder 23 receives and adds the output signal of second antenna 29 and the output signal of second amplitude-phase regulator 22 as the two output signals and outputs the addition result as an output signal.

Second tuner 24 receives the output signal of second adder 23. Thus, second tuner 24 receives the output signal of second antenna 29 via matching circuit 21 and second adder 23. Second tuner 24 performs RF amplification, frequency conversion, and the like in the same manner as in first tuner 14.

Diversity receiver 30 receives and combines the output signals of first and second tuners 14 and 24. This combination can be, for example, carrier maximum ratio combining so as to perform diversity demodulation.

Controller 40 receives reception quality signal 31 from diversity receiver 30 so as to control first and second amplitude-phase regulators 12 and 22 according to reception quality signal 31.

As shown in FIG. 6, second sensor 18 is placed in the vicinity of the ground plane of the feeding point of first antenna 19 so as to pick up a current component due to electromagnetic coupling (shown by arrow 17 in FIG. 6) of first antenna 19 flowing to the ground plane of matching circuit 11 of first antenna 19. More specifically, second sensor 18 is placed within the area of ¼ λ including the current component due to electromagnetic coupling and within 0.15 m from the feeding point of first antenna 19, that is, from the ground part of matching circuit 11. Thus, the feeding point of first antenna 19 and the center of second sensor 18 are away from each other by a distance within ¼ of the wavelength of a received radio wave. As shown by arrow 42 of FIG. 6, first and second sensors 28 and 18 are oriented orthogonal to each other.

The signal component received by first antenna 19 is induced to second sensor 18, which is thus placed close to first antenna 19. Second sensor 18 also picks up the noise components released from the various noise sources in the device together with the signal component received by first antenna 19. Second amplitude-phase regulator 22 controls the amplitude and phase of a first pickup signal outputted from second sensor 18.

Controller 40 controls the amplitude and phase of the first pickup signal outputted from first sensor 28 according to reception quality signal 31 outputted from diversity receiver 30 so as to control first amplitude-phase regulator 12, thereby optimizing reception quality signal 31. Controller 40 also controls the amplitude and phase of a second pickup signal outputted from second sensor 18 so as to control second amplitude-phase regulator 22, thereby optimizing reception quality signal 31. This control allows wireless device 10c according to the present exemplary embodiment to have the function of removing the coupling and correlation of antennas. The detailed operation to cancel the coupled component of first and second antennas 19 and 29 will be omitted because it is identical to that described in the first exemplary embodiment.

Figure 7:
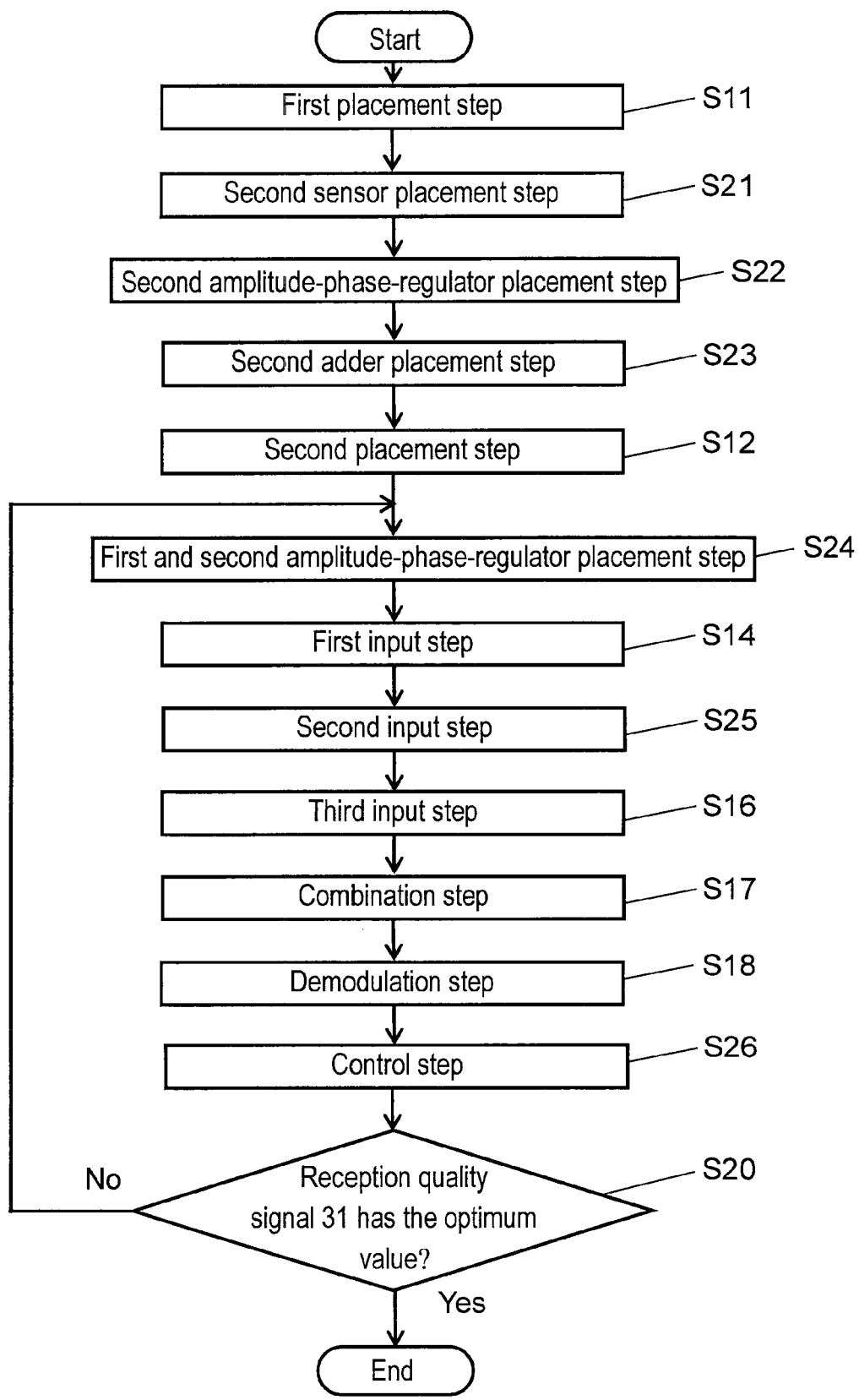
FIG. 7 is a flowchart showing a method for removing the coupling and correlation of antennas according to the third exemplary embodiment of the present invention.

A specific procedure of the method for removing the coupling and correlation of antennas according to the present exemplary embodiment will be described as follows. FIG. 7 is a flowchart showing the method according to the third exemplary embodiment. The method for removing the coupling and correlation of antennas according to the present exemplary embodiment involves, in addition to the steps in the method according to the first exemplary embodiment, a second-sensor placement step, a second amplitude-phase-regulator placement step, and a second adder placement step. These placement steps are not necessarily carries out in the order shown in the flowchart of FIG. 7. The second amplitude-phase-regulator placement step further places second amplitude-phase regulator 22 in addition to first amplitude-phase regulator 12. In the control step, controller 40 controls second amplitude-phase regulator 22 in addition to first amplitude-phase regulator 12.

The following is a detailed description of the method for removing the coupling and correlation of antennas according to the present exemplary embodiment. Like steps are labeled with like reference numerals with respect to the first exemplary embodiment, and hence the description thereof will be omitted.

The second sensor placement step places second sensor 18 in the vicinity of the ground plane of the feeding point of first antenna 19 (Step S21). First, the reception frequency is set to a channel having a low level of first pickup signal outputted from first sensor 28 and a low level of second pickup signal outputted from second sensor 18, which are combined noise sources used for removing the coupling and correlation of antennas. This channel can be preset based on clock frequencies of the units used in the system.

The second amplitude-phase-regulator placement step places second amplitude-phase regulator 22, which receives the second pickup signal from second sensor 18 (Step S22). The signal component received by first antenna 19 is induced to second sensor 18. Second sensor 18 also picks up the noise component released from the various noise sources in the device together with the signal component received by first antenna 19.

The second adder placement step then places second adder 23, which receives and adds the output signal of second antenna 29 and the output signal of second amplitude-phase regulator 22 as the two output signals (Step S23).

A second placement step places diversity receiver 30, which receives the output signals of first and second tuners 14 and 24, and controller 40, which receives reception quality signal 31 from diversity receiver 30 (Step S12). Controller 40 first supplies first and second amplitude-phase regulators 12 and 22 with control parameters as a default value, and then controls the amplitudes and phases of the signals of first and second sensors 28 and 18 by the control parameters.

The first and second amplitude-phase regulation step allows first amplitude-phase regulator 12 to control the amplitude and phase of a pickup signal outputted from first sensor 28, and also allows second amplitude-phase regulator 22 to control the amplitude and phase of the second pickup signal outputted from second sensor 18 (Step S24).

The second input step allows second adder 23 to receive and add the output signal of second antenna 29 and the output signal of second amplitude-phase regulator 22, and to output the addition result to second tuner 24. The second input step then allows second tuner 24 to receive the output signal of second antenna 29 via second adder 23 (Step S25).

The control step allows controller 40 to control first amplitude-phase regulator 12 in the same manner as in the first exemplary embodiment, and to further control the amplitude and phase of the second pickup signal of second sensor 18 according to reception quality signal 31 outputted from diversity receiver 30. The control step thus allows controller 40 to control second amplitude-phase regulator 22 so as to optimize reception quality signal 31 (Step S26). Thus, controller 40 changes some of the control parameters with reference to the received signal strength indication parameter (RSSI), the bit error ratio (BER), and the C/N ratio (CN) indicating the reception quality at this time.

When the value of reception quality signal 31 increases or decreases as a result of changing the control parameters, controller 40 stores the optimum value in the memory, and then confirms whether or not reception quality signal 31 has the optimum value (Step S20). When it is optimum (Yes), the series of processes is completed; otherwise (No), the process goes back to Step S24 to repeat the series of processes. Controller 40 shifts the change of the control parameters from rough to detailed, thereby improving control precision. Thus, controller 40 controls first and second amplitude-phase regulators 12 and 22 so as to optimize reception quality signal 31.

First and second sensors 28 and 18 have only to be able to pick up the current component due to electromagnetic coupling of first and second antennas 19 and 29, respectively. Therefore, first and second sensors 28 and 18 can have a smaller antenna gain than first and second antennas 19 and 29. Furthermore, first sensor 28 and second antenna 29 can be loosely coupled, and second sensor 18 and first antenna 19 can also be loosely coupled. First and second sensors 28 and 18 are oriented substantially orthogonal to each other.

Therefore, the antenna coupling between first and second sensors 28 and 18 is much smaller than that between first and second antennas 19 and 29. As a result, the antenna coupling between first and second sensors 28 and 18 causes no significant decrease in the receiving sensitivity, thereby maximizing the receiving sensitivity of first and second antennas 19 and 29.

Fourth Exemplary Embodiment

Figure 8:
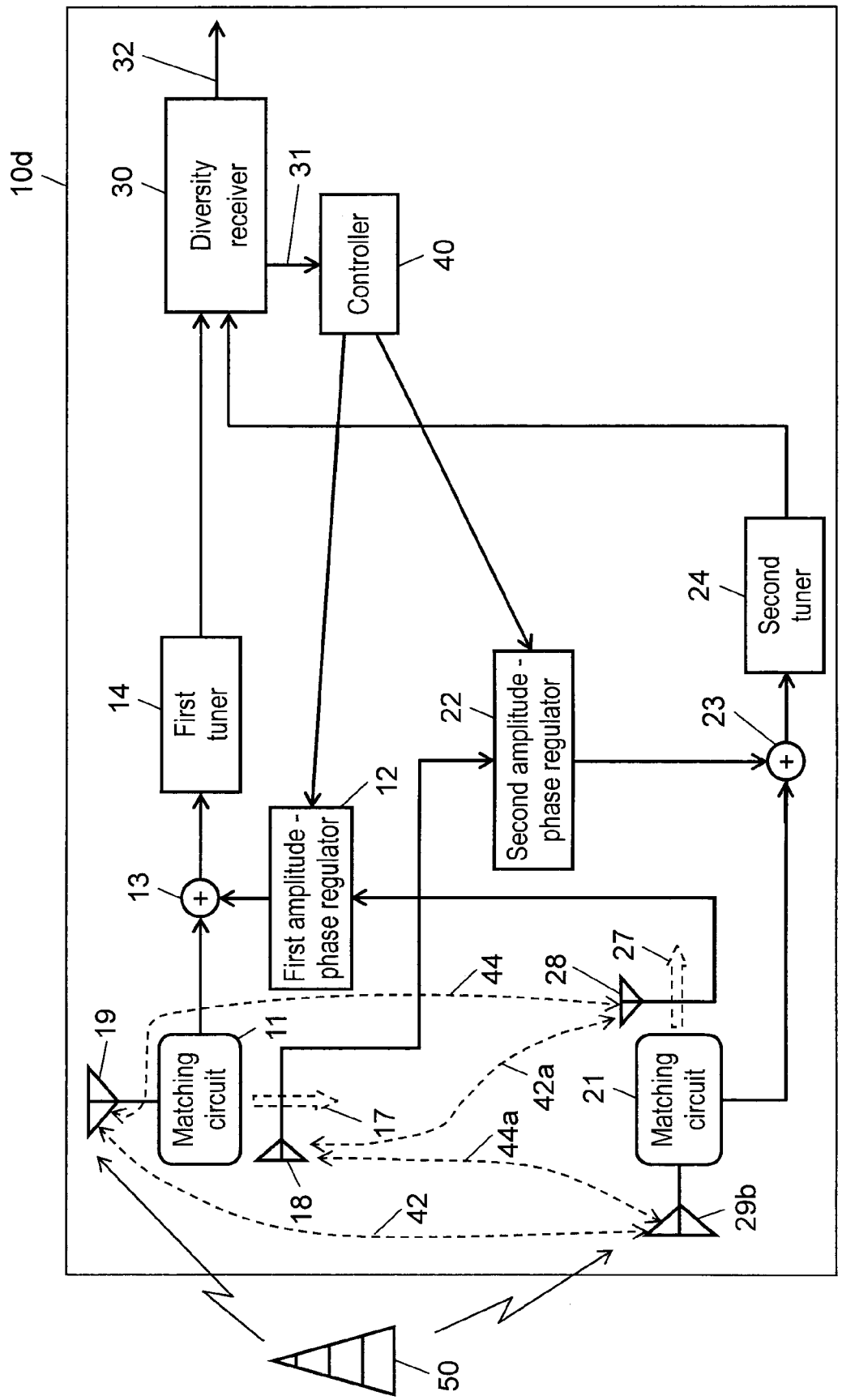
FIG. 8 is a block diagram of a wireless device having the function of removing the coupling and correlation of antennas according to a fourth exemplary embodiment of the present invention.

FIG. 8 is a block diagram of wireless device 10d having the function of removing the coupling and correlation of antennas according to a fourth exemplary embodiment of the present invention. In the third exemplary embodiment, as shown in FIG. 6, the system including second antenna 29 has the same structure as the system including first antenna 19 so as to cancel the antenna coupling independently of each other, and first and second antennas 19 and 29 are oriented substantially in the same direction. In wireless device 10d according to the present fourth exemplary embodiment, as shown by arrow 42 in FIG. 8, first and second antennas 19 and 29b are oriented substantially orthogonal to each other. Thus, first antenna 19 receives signals mainly in the vertical plane of polarization, and second antenna 29b receives signals mainly in the horizontal plane of polarization.

Therefore, the placements in the present exemplary embodiment, which are the same as those in the second exemplary embodiment, allow first and second antennas 19 and 29b to be much more loosely coupled than in the first exemplary embodiment in which first and second antennas 19 and 29 are oriented substantially in the same direction. Making first and second antennas 19 and 29b have different planes of polarization from each other in this manner can reduce the signal due to the electromagnetic coupling between first and second antennas 19 and 29b, which is the cause of desensitization.

First sensor 28 receives signals mainly in the same plane of polarization as first antenna 19 as shown by arrow 44 of FIG. 8. Second sensor 18 receives signals mainly in the same plane of polarization as second antenna 29b as shown by arrow 44a of FIG. 8. The other components are identical to those in the third exemplary embodiment, and therefore, like components and functions are labeled with like reference numerals with respect to the third exemplary embodiment, and hence the description thereof will be omitted.

In the present exemplary embodiment, first and second antennas 19 and 29b are oriented substantially orthogonal to each other, and first sensor 28 and first antenna 19 are oriented substantially in the same direction. As a result, the first pickup signal outputted from first sensor 28 can contain as many signals in the plane of polarization of first antenna 19 as possible. This increases the effect of cancelling the component which degrades the receiving sensitivity due to the antenna coupling. In addition, second sensor 18 and second antenna 29b are oriented substantially in the same direction so that the second pickup signal outputted from second sensor 18 can contain as many signals in the plane of polarization of second antenna 29b as possible. This synergistically increases the effect of cancelling the component which degrades the receiving sensitivity due to the antenna coupling.

These features provide wireless device 10d having the function of removing the coupling and correlation of antennas so as to be capable of reducing a decrease in the receiving sensitivity due to the close location of the two antennas, thereby maximizing the antenna performance.

First sensor 28 may be designed to pick up the noise components released from the various noise sources in the device. This enables wireless device 10d to be entirely controlled by controller 40 as follows depending on the reception channel and the bandwidth, thereby providing a normal noise-cancelling function. When the largest cause of the decrease in the receiving sensitivity is the antenna coupling, the coupled component is mainly cancelled, and when the cause is a noise component, the noise component is mainly cancelled.

Fifth Exemplary Embodiment

Figure 9:
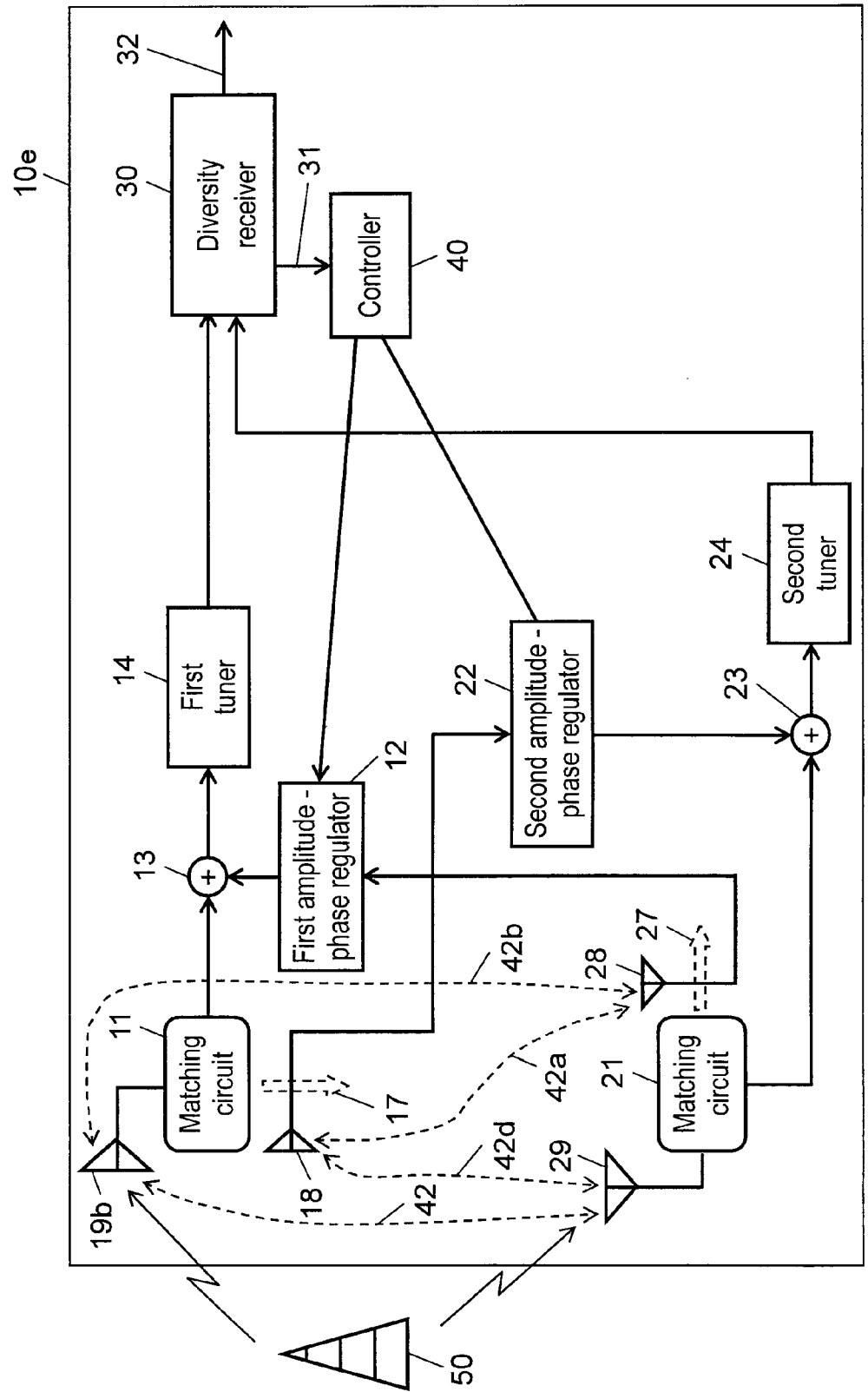
FIG. 9 is a block diagram of a wireless device having the function of removing the coupling and correlation of antennas according to a fifth exemplary embodiment of the present invention.
Figure 10:
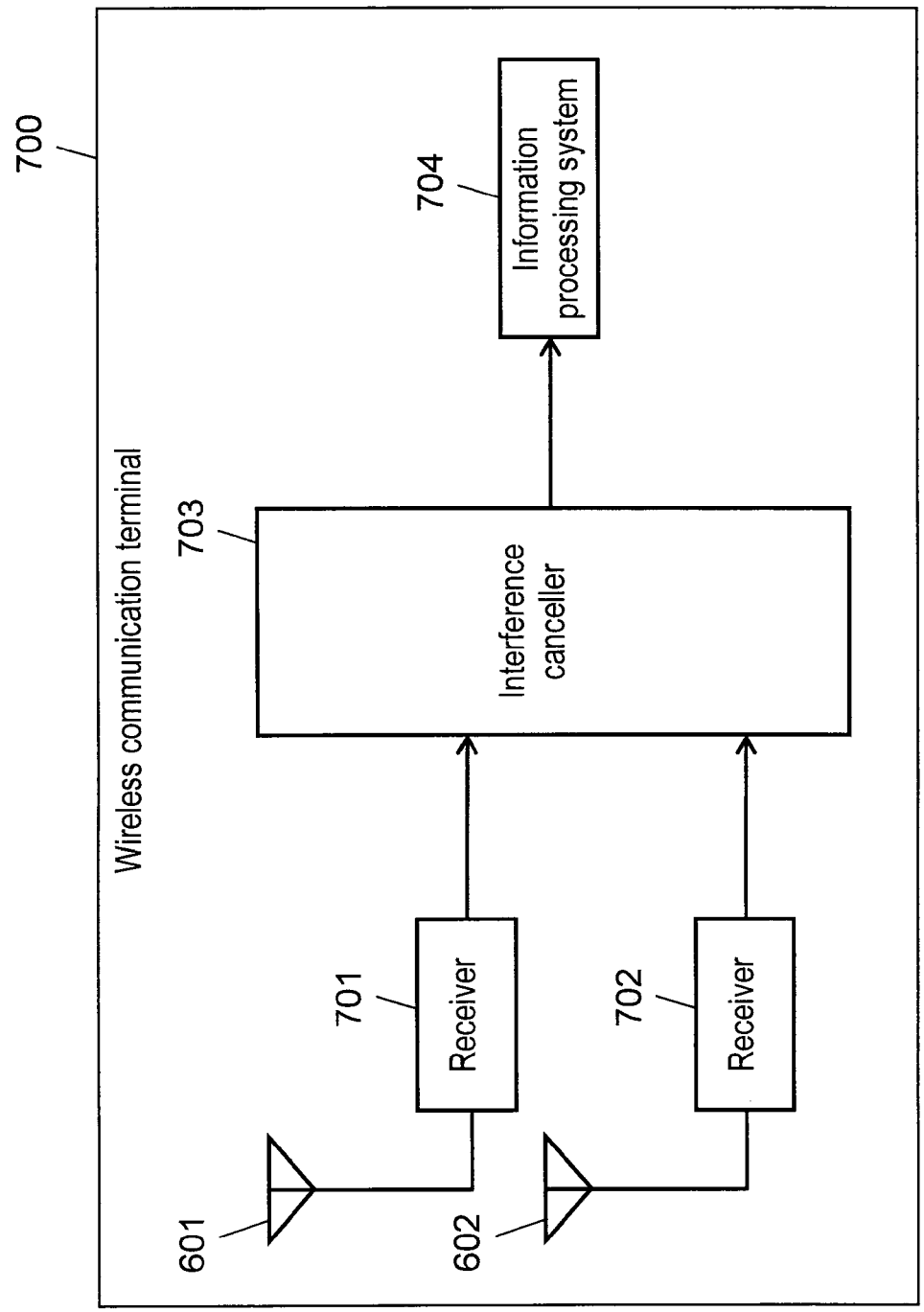
FIG. 10 is a block diagram showing a conventional wireless communication terminal.
Figure 11:
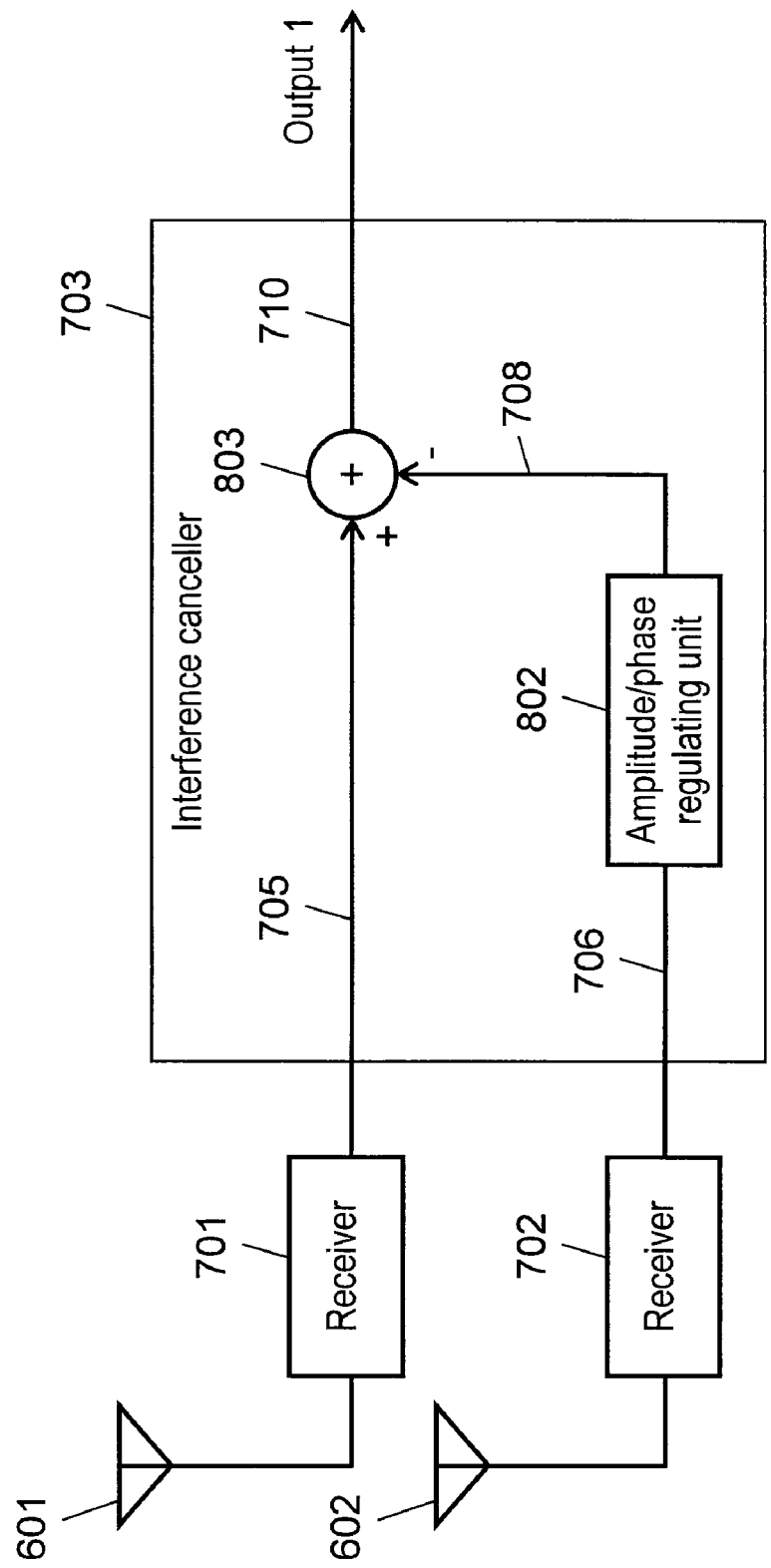
FIG. 11 is a block diagram showing a structure of an interference canceller of the conventional wireless communication terminal.
Figure 12:
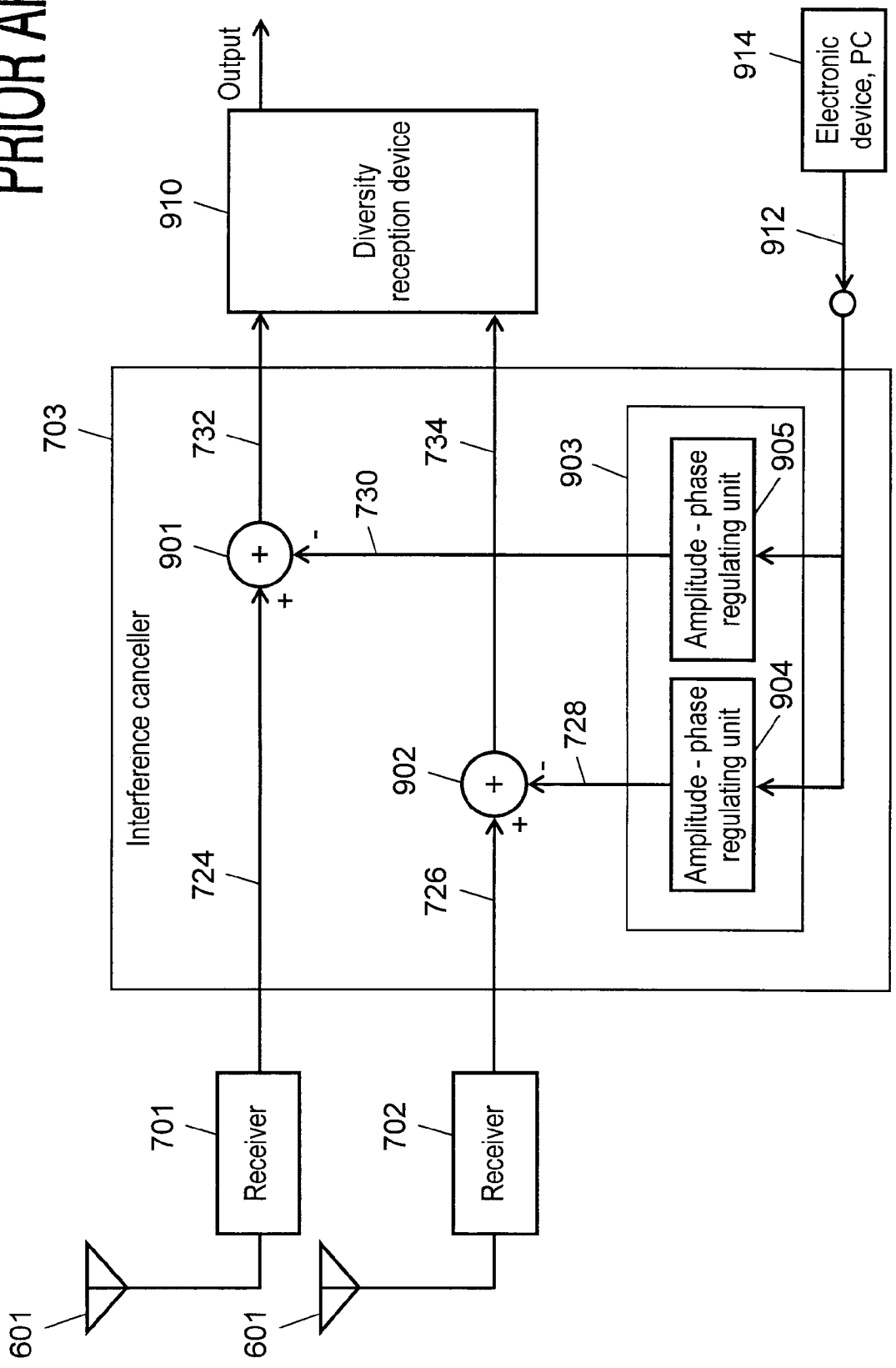
FIG. 12 is a block diagram showing another structure of an interference canceller of the conventional wireless communication terminal.

FIG. 9 is a block diagram of wireless device 10e having the function of removing the coupling and correlation of antennas according to a fifth exemplary embodiment of the present invention. In the third exemplary embodiment, as shown in FIG. 6, the system including second antenna 29 has the same structure as the system including first antenna 19 so as to cancel the antenna coupling independently of each other. In the present exemplary embodiment, on the other hand, as shown by arrow 42 of FIG. 9, first and second antennas 19b and 29 are oriented substantially orthogonal to each other. More specifically, first antenna 19b receives signals mainly in the horizontal plane of polarization, and second antenna 29 receives signals mainly in the vertical plane of polarization. As shown by arrow 42a, first and second sensors 28 and 18 are oriented substantially orthogonal to each other. As shown by arrow 42b, first antenna 19b and first sensor 28 are oriented substantially orthogonal to each other. As shown by arrow 42d, second antenna 29 and second sensor 18 are oriented substantially orthogonal to each other. In the present exemplary embodiment, like components and functions are labeled with like reference numerals with respect to the other exemplary embodiments and hence the description thereof will be omitted.

These placements allow first and second antennas 19b and 29 to be much more loosely coupled than in the first exemplary embodiment in which first and second antennas 19 and 29 are oriented substantially in the same direction. Making first and second antennas 19*b* and 29 have different planes of polarization from each other in this manner can reduce the signal due to the electromagnetic coupling between first and second antennas 19*b* and 29, which is the cause of desensitization.

First and second sensors 28 and 18, which are oriented substantially orthogonal to each other, can reduce the signal due to the electromagnetic coupling between them. First and second sensors 28 and 18 also play a role in cancelling the coupled component caused by the antennas interaction, using the signal components induced thereto. This eliminates the need to capture a higher-than-necessary level of signal component to be induced. Therefore, in the present exemplary embodiment, first and second sensors 28 and 18 are oriented substantially orthogonal to each other. As a result, a coupled component does not cause between first and second sensors 28 and 18.

INDUSTRIAL APPLICABILITY

The method and function of removing the coupling and correlation of antennas according to the present invention can prevent a decrease in the receiving sensitivity due to the diversity antenna coupling in a small-sized device. The present invention is therefore useful to receiving devices small enough to be portable and various wireless devices employing the method for removing the coupling and correlation of antennas so as to receive broadcast waves with high sensitivity and stability using the diversity function and the function of removing the coupling and correlation of antennas.

The invention claimed is:

1. A method for removing coupling and correlation of antennas for diversity reception in which a first antenna and a second antenna are placed so that a distance between one of a part or a feeding point of the first antenna and one of a part or a feeding point of the second antenna is within $\frac{1}{2}$ of a wavelength of a received radio wave, the method comprising:
a first placement step for placing:
a first sensor in a vicinity of a ground plane of the feeding point of the second antenna;
a first amplitude-phase regulator controlling an amplitude and phase of a first pickup signal outputted from the first sensor;
a first adder receiving and adding an output signal of the first antenna and an output signal of the first amplitude-phase regulator, and outputting the addition result as an output signal;
a first tuner receiving the output signal of the first antenna via the first adder; and
a second tuner receiving an output signal of the second antenna,
a second placement step for placing:
a diversity receiver receiving an output signal of the first tuner and an output signal of the second tuner; and
a controller receiving a reception quality signal from the diversity receiver;
an amplitude-phase regulation step for allowing the first amplitude-phase regulator to control the amplitude and phase of the pickup signal outputted from the first sensor;
a first input step for allowing the first adder to receive and add the output signal of the first antenna and the output signal of the first amplitude-phase regulator as the two output signals and then to output the addition result as an output signal, and for allowing the first tuner to receive the output signal of the first antenna via the first adder;
a second input step for allowing the second tuner to receive the output signal of the second antenna;
a third input step for allowing the diversity receiver to receive the output signal of the first tuner and the output signal of the second tuner;
a combination step for allowing the diversity receiver to combine the output signal of the first tuner and the output signal of the second tuner;
a demodulation step for allowing the diversity receiver to perform diversity demodulation using the output signal of the first antenna and the output signal of the second antenna; and
a control step for allowing the controller to control the amplitude and phase of the first pickup signal according to the reception quality signal outputted from the diversity receiver so as to control the first amplitude-phase regulator for optimizing the reception quality signal.

2. The method for removing the coupling and correlation of antennas of claim 1, wherein
the feeding point of the second antenna and a center of the first sensor are away from each other by a distance within $\frac{1}{4}$ of the wavelength of the received radio wave.

3. The method for removing the coupling and correlation of antennas of claim 1, wherein
the first antenna and the second antenna are oriented substantially orthogonal to each other.

4. The method for removing the coupling and correlation of antennas of claim 1, wherein
the first sensor and the first antenna are oriented substantially in a same direction.

5. The method for removing the coupling and correlation of antennas of claim 1, wherein
the reception quality signal is at least one of a received signal strength parameter, a bit error ratio, and a C/N ratio.

6. The method for removing the coupling and correlation of antennas of claim 1, wherein
the first placement step further includes a second sensor placement step, a second amplitude-phase-regulator placement step, and a second adder placement step, wherein
the second sensor placement step places a second sensor in a vicinity of a ground plane of the feeding point of the first antenna;
the second amplitude-phase-regulator placement step places a second amplitude-phase regulator receiving a second pickup signal outputted from the second sensor;
the second adder placement step places a second adder receiving two output signals;
the second input step also allows the second adder to receive and add the output signal of the second antenna and an output signal of the second amplitude-phase regulator as the two output signals and to output the addition result as an output signal, and then allows the second tuner to receive the output signal of the second antenna via the second adder;
the amplitude-phase regulation step further allows the second amplitude-phase regulator to control an amplitude and phase of the second pickup signal of the second sensor; and
the control step allows the controller to control the amplitude and phase of the second pickup signal outputted from the second sensor according to the reception quality signal outputted from the diversity receiver so as to control the second amplitude-phase regulator for optimizing the reception quality signal.

7. The method for removing the coupling and correlation of antennas of claim 6, wherein
the first antenna and the second antenna are oriented substantially orthogonal to each other.

8. The method for removing the coupling and correlation of antennas of claim 6, wherein
the first sensor and the second sensor are oriented substantially orthogonal to each other.

9. A wireless device having a function of removing coupling and correlation of antennas for diversity reception in which a first antenna and a second antenna are placed so that a distance between one of a part or a feeding point of the first antenna and one of a part or a feeding point of the second antenna is within ½ of a wavelength of a received radio wave, the wireless device comprising:
a first sensor in a vicinity of a ground plane of the feeding point of the second antenna;
a first amplitude-phase regulator controlling an amplitude and phase of a first pickup signal outputted from the first sensor;
a first adder receiving and adding an output signal of the first antenna and an output signal of the first amplitude-phase regulator and outputting the addition result as an output signal;
a first tuner receiving the output signal of the first antenna via the first adder;
a second tuner receiving an output signal of the second antenna;
a diversity receiver receiving an output signal of the first tuner and an output signal of the second tuner; and
a controller receiving a reception quality signal from the diversity receiver, wherein
the diversity receiver combines the output signal of the first tuner and the output signal of the second tuner, and performs diversity demodulation using the output signal of the first antenna and the output signal of the second antenna, and
the controller controls the amplitude and phase of the first pickup signal according to the reception quality signal outputted from the diversity receiver so as to control the first amplitude-phase regulator for optimizing the reception quality signal.

10. The wireless device having the function of removing the coupling and correlation of antennas of claim 9, wherein the feeding point of the second antenna and a center of the first sensor are away from each other by a distance within ¼ of the wavelength of the received radio wave.

11. The wireless device having the function of removing the coupling and correlation of antennas of claim 9, wherein
the first antenna and the second antenna are oriented substantially orthogonal to each other.

12. The wireless device having the function of removing the coupling and correlation of antennas of claim 9, wherein
the first sensor and the first antenna are oriented substantially in the same direction.

13. The wireless device having the function of removing the coupling and correlation of antennas of claim 9, wherein
the reception quality signal is at least one of a received signal strength parameter, a bit error ratio, and a C/N ratio.

14. The wireless device having the function of removing the coupling and correlation of antennas of claim 9, further comprising:
a second sensor in a vicinity of a ground plane of the feeding point of the first antenna;
a second amplitude-phase regulator controlling an amplitude and phase of a second pickup signal outputted from the second sensor according to the reception quality signal outputted from the diversity receiver; and
a second adder receiving and adding the output signal of the second antenna and an output signal of the second amplitude-phase regulator as the two output signals and outputting the addition result as an output signal, wherein
the second tuner receives the output signal of the second antenna via the second adder, and
the controller controls the amplitude and phase of the second pickup signal according to the reception quality signal outputted from the diversity receiver so as to control the second amplitude-phase regulator for optimizing the reception quality signal.

15. The wireless device having the function of removing the coupling and correlation of antennas of claim 14, wherein
the first antenna and the second antenna are oriented substantially orthogonal to each other.

16. The wireless device having the function of removing the coupling and correlation of antennas of claim 14, wherein
the first sensor and the second sensor are oriented substantially orthogonal to each other.

* * * * *

UNITED STATES PATENT AND TRADEMARK OFFICE
CERTIFICATE OF CORRECTION

PATENT NO. : 8,086,202 B2
APPLICATION NO. : 12/602282
DATED : December 27, 2011
INVENTOR(S) : Naoki Ejima It is certified that error appears in the above-identified patent and that said Letters Patent is hereby corrected as shown below:

IN THE SPECIFICATIONS:

In column 1, after the Title and before Technical Field, please insert:
--THIS APPLICATION IS A U.S. NATIONAL PHASE APPLICATION OF PCT INTERNATIONAL APPLICATION PCT/JP2009/001629--

In column 4, line 64 please delete "34" and instead insert --24--

Signed and Sealed this
Twenty-second Day of May, 2012

David J. Kappos
*Director of the United States Patent and Trademark Office*